US012763901B2

(12) United States Patent
Peng et al.

(10) Patent No.: US 12,763,901 B2
(45) Date of Patent: Oct. 13, 2026

(54) METHOD FOR DETERMINING OVERHEAD REFERENCE VALUE FOR DMRS AND TERMINAL

(71) Applicant: VIVO MOBILE COMMUNICATION CO., LTD., Chang'an Dongguan (CN)

(72) Inventors: Shuyan Peng, Chang'an Dongguan (CN); Zichao Ji, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 1049 days.

(21) Appl. No.: 17/957,280

(22) Filed: Sep. 30, 2022

(65) Prior Publication Data

US 2023/0031787 A1 Feb. 2, 2023

Related U.S. Application Data

(63) Continuation of application No. PCT/CN2021/085811, filed on Apr. 7, 2021.

(30) Foreign Application Priority Data

Apr. 7, 2020 (CN) ........................ 202010266923.7

(51) Int. Cl.
*H04L 5/00* (2006.01)

(52) U.S. Cl.
CPC .................................. *H04L 5/0051* (2013.01)

(58) Field of Classification Search
CPC ..................................................... H04L 5/0051
USPC ......................................................... 370/329
See application file for complete search history.

(56) References Cited

U.S. PATENT DOCUMENTS

2017/0094657 A1 3/2017 Yoon
2019/0313436 A1 10/2019 Lee et al.
2020/0022089 A1 1/2020 Guo
2020/0029318 A1 1/2020 Guo
2020/0146000 A1 * 5/2020 Shin .................... H04L 27/2613
2021/0160026 A1 5/2021 Wang et al.
2022/0330042 A1 * 10/2022 Liu ....................... H04L 5/0053

FOREIGN PATENT DOCUMENTS

CN 110800237 A 2/2020

OTHER PUBLICATIONS

CATT., "Physical layer structure for NR sidelink," 3GPP TSG RAN WG1 Meeting #99, R1-1912153, pp. 1-22, (Nov. 22, 2019).
LG Electronics., "Discussion on physical layer structure for NR sidelink," 3GPP TSG RAN WG1 #99, R1-1912586, pp. 1-34, (Nov. 18-22, 2019).

(Continued)

*Primary Examiner* — Chi Tang P Cheng
(74) *Attorney, Agent, or Firm* — Foley & Lardner LLP

(57) ABSTRACT

A method for determining an overhead reference value for DMRS and a terminal are provided. The method includes: determining an overhead reference value for DMRS based on first information, where the first information includes at least one of PSFCH configuration information, SCI, and higher-layer signaling configuration information, and the overhead reference value includes a time-domain overhead reference value and a frequency-domain overhead reference value.

14 Claims, 7 Drawing Sheets

(56) References Cited

OTHER PUBLICATIONS

Apple., "On NR V2X Physical Layer Structure," 3GPP TSG RAN WG1 #99, R1-1912810, pp. 1-15, (Nov. 22, 2019).
Extended European Search Report dated Sep. 7, 2023 as received in Application No. 21784956.1.
JP Office Action dated Oct. 24, 2023 as received in Application No. 2022-557879.
LG Electronics., "Feature lead summary for agenda item 7.2.4.1.1 Physical layer structure," 3GPP TSG RAN WG1 #96, R1-1903366, pp. 1-30, (Feb. 26, 2019).
Huawei, et al., "Sidelink physical layer structure for NR V2X," 3GPP TSG RAN WG1 Meeting #96bis, R1-1903943, pp. 1-17, (Apr. 8-12, 2019).
Fujitsu., "Discussion on physical layer structure for NR sidelink," 3GPP TSG RAN WG1 #97, R1-1906436, pp. 1-17, (May 13-17, 2019).
CATT., "Remaining issues on physical layer structure for NR sidelink," 3GPP TSG RAN WG1 #100, R1-2000520, pp. 1-15, (Mar. 6, 2020).
LG Electronics., "Discussion on physical layer structure for NR sidelink," 3GPP TSG RAN WG1 Meeting #100, R1-2000781, pp. 1-32, (Mar. 6, 2020).
International Search Report and Written Opinion of the International Searching Authority dated Jul. 7, 2021 as received In Application No. PCT/CN2021/085811.
CN Office Action in Application No. 202010266923.7 Dated Mar. 28, 2022.

* cited by examiner

METHOD FOR DETERMINING OVERHEAD REFERENCE VALUE FOR DMRS AND TERMINAL

CROSS-REFERENCE TO RELATED APPLICATIONS

This application is continuation application of PCT International Application No. PCT/CN2021/085811 filed on Apr. 7, 2021, which claims priority to Chinese Patent Application No. 202010266923.7, filed in China on Apr. 7, 2020, which are incorporated in their entireties by reference herein.

TECHNICAL FIELD

The present disclosure relates to the field of communications technologies, and in particular, to a method for determining an overhead reference value for DMRS and a terminal.

BACKGROUND

A long term evolution (LTE) communications system supports sidelink (or translated as secondary link, side link, or side-link, SL), allowing terminals to directly transmit data without through network-side devices.

Hybrid automatic repeat request (HARD) transmission is supported in sidelink, and a terminal needs to calculate a transport block size (TBS) separately for initial transmission and retransmission, and ensure that the calculated TBS is consistent in initial transmission and retransmission. During TBS calculation, demodulation reference signal (DMRS) overheads need to be considered. In a case that physical sidelink feedback channel (PSFCH) overheads are present, a DMRS and a PSFCH may have a resource collision, and consequently DMRS overheads for initial transmission and retransmission determined by the terminal cannot be kept consistent.

SUMMARY

Embodiments of the present disclosure provide a method for determining an overhead reference value for DMRS and a terminal, so as to resolve the problem that DMRS overheads for initial transmission and retransmission determined by the terminal cannot be kept consistent.

In order to resolve the foregoing problem, the present disclosure is implemented as follows:

According to a first aspect, an embodiment of the present disclosure provides a method for determining an overhead reference value for DMRS, applied to a terminal, where the method includes:

determining an overhead reference value for DMRS based on first information, where the first information includes at least one of physical sidelink feedback channel PSFCH configuration information, sidelink control information SCI, and higher-layer signaling configuration information, and the overhead reference value includes a time-domain overhead reference value and a frequency-domain overhead reference value.

According to a second aspect, an embodiment of the present disclosure provides a terminal, including:

a determining module, configured to determine an overhead reference value for DMRS based on first information, where the first information includes at least one of physical sidelink feedback channel PSFCH configuration information, sidelink control information SCI, and higher-layer signaling configuration information, and the overhead reference value includes a time-domain overhead reference value and a frequency-domain overhead reference value.

According to a third aspect, an embodiment of the present disclosure provides a terminal, including a memory, a processor, and a computer program stored in the memory and capable of running on the processor, where when the computer program is executed by the processor, the steps of the method for determining an overhead reference value for DMRS according to the first aspect in the embodiments of the present disclosure are implemented.

According to a fourth aspect, an embodiment of the present disclosure provides a computer-readable storage medium, where a computer program is stored in the computer-readable storage medium, and when the computer program is executed by a processor, the steps of the method for determining an overhead reference value for DMRS according to the first aspect in the embodiments of the present disclosure are implemented.

According to a fifth aspect, an embodiment of the present disclosure provides a computer software product, where the computer software product is stored in a non-volatile storage medium, and the software product is configured to implement the steps of the method for determining an overhead reference value for DMRS according to the first aspect in the embodiments of the present disclosure.

In the embodiments of the present disclosure, the terminal may determine the overhead reference value for the DMRS based on at least one of the PSFCH configuration information, the SCI, and higher-layer signaling configuration information. In this way, no matter whether initial transmission and retransmission are located in or not located in a slot carrying the PSFCH, the overhead reference values for the DMRS determined by the terminal for initial transmission and retransmission can keep consistent, so as to ensure a same TBS calculation result for initial transmission and retransmission, thereby implementing merging of initial transmission and retransmission.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In the specification and claims of this application, the term “include” and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, “and/or” represents presence of at least one of the connected objects, for example, “A and/or B” indicates the following three cases: A alone, B alone, or both A and B.

In the embodiments of the present disclosure, the terms “an example” or “for example” are used to represent an example, an illustration, or a description. Any embodiment or design scheme described as “an example” or “for example” in the embodiments of the present disclosure should not be construed as being more preferred or advantageous than other embodiments or design schemes. To be precise, the words such as “an example” or “for example” are intended to present a related concept in a specific manner.

The following describes the embodiments of the present disclosure with reference to the accompanying drawings. The embodiments provided by the present disclosure may be applied to a wireless communications system. The wireless communications system may be a fifth-generation (5G) system, or an evolved long term evolution (eLTE) system, or a later evolved communications system.

Figure 1:
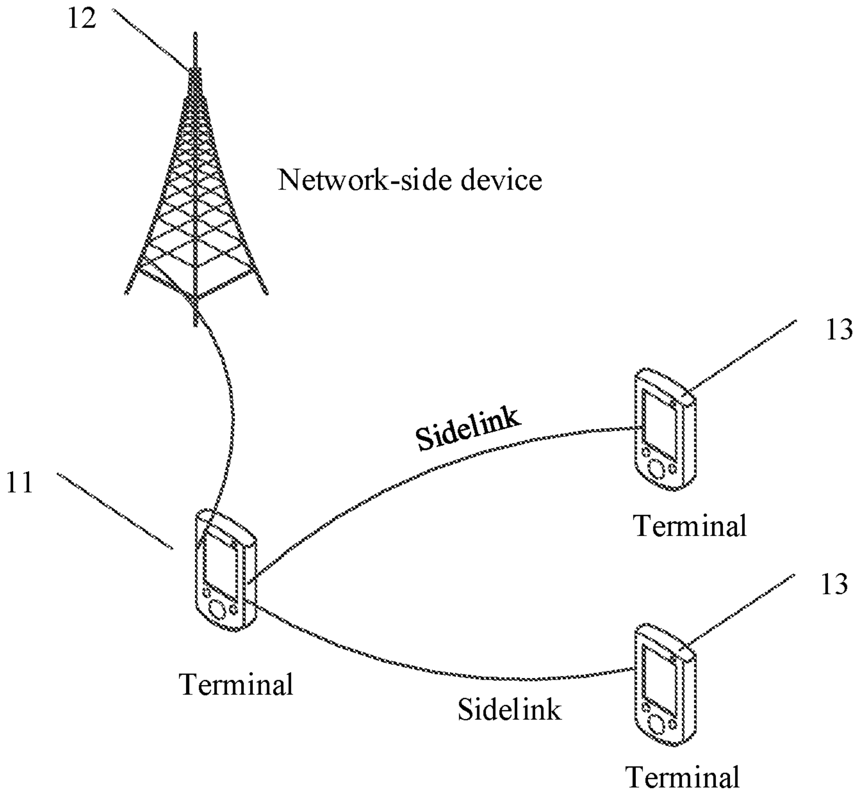
FIG. 1 is a structural diagram of a network system according to an embodiment of the present disclosure.

FIG. 1 is a structural diagram of a network system according to an embodiment of the present disclosure. As shown in FIG. 1, the network system includes a terminal 11, a network-side device 12, and a terminal 13. The terminal 11 is connected to the network-side device 12, and the terminal 11 and terminal 13 are connected through sidelink. The terminal 11 and the terminal 13 may both be a mobile communications devices, and may be, for example, a mobile phone, a tablet computer (Tablet Personal Computer), a laptop computer, a personal digital assistant (PDA), a mobile internet device (MID), a wearable device, or the like; or may be an intelligent in-vehicle device of a vehicle, a road side unit (RSU), an infrastructure, or the like. It should be noted that a specific type of the terminal 11 and the terminal 13 is not limited in the embodiments of the present disclosure.

The network-side device 12 may be a 5G network-side device (such as a gNB or a 5G new radio (New Radio, NR) base station (Node Base station, NB)), or may be a fourth generation (4G) network-side device (such as an eNB), or may be a 3G network-side device (such as an NB) or a network-side device in a later evolved communications system, or the like. It should be noted that a specific type of the network-side device 12 is not limited in the embodiments of the present disclosure.

In the terminal 11 and terminal 13 performing data transmission through sidelink, one is a receive terminal and the other is a transmit terminal.

Figure 2:
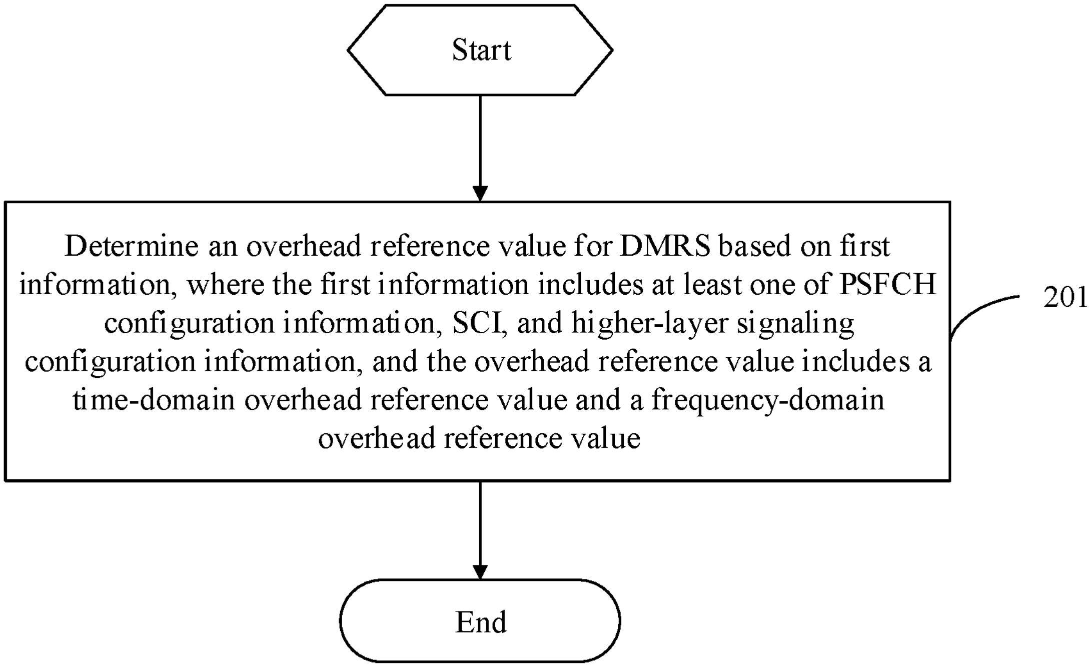
FIG. 2 is a flowchart of a method for determining an overhead reference value for DMRS according to an embodiment of the present disclosure.

FIG. 2 is a flowchart of a method for determining an overhead reference value for DMRS according to an embodiment of the present disclosure. As shown in FIG. 2, a method for determining an overhead reference value for DMRS applied to a terminal is provided and includes the following steps.

Step 201: Determine an overhead reference value for DMRS based on first information, where the first information includes at least one of PSFCH configuration information, SCI, and higher-layer signaling configuration information, and the overhead reference value includes a time-domain overhead reference value and a frequency-domain overhead reference value.

LTE SL supports only broadcast communication, and therefore LTE SL is mainly used for basic safety communication, for example, specific public safety affairs (such as emergency communication in fire sites or disaster sites such as earthquakes) or vehicle to everything (V2X) communication. Other advanced V2X services with strict quality of service (QoS) requirements in terms of delay, reliability, and the like are supported by NR SL.

On LTE SL, the terminal transmits sidelink control information (SCI) through a physical sidelink control channel (PSCCH), and transmits data by scheduling physical sidelink shared channel (PSSCH) transmission. Transmission is performed in a form of broadcast, and the receive terminal does not reply to the transmit terminal whether reception is successful.

In order to carry acknowledgement (ACK) or negative acknowledgement (NACK) feedback information on the SL, NR V2X supports a new SL channel, that is, physical sidelink feedback channel (PSFCH). A periodicity of PSFCH in time domain is N (N is 1, 2, or 4), where N may be understood as PSFCH being contained in every N slots. The last 4 symbols in a slot containing PSFCH are used for PSFCH and guard period (GP), and a sequence of the four symbols is GP, automatic gain control (AGC), PSFCH, and GP. Slots included in calculation herein are slots already allocated to SL.

Because the PSFCH is present periodically in some slots in time domain, initial transmission of a transport block (TB) may be performed in a slot carrying PSFCH, and retransmission is performed in a slot carrying no PSFCH; or initial transmission may be performed in a slot carrying no PSFCH and retransmission is performed in a slot carrying PSFCH. In order to ensure that DMRS overheads determined by the terminal for initial transmission and the retransmission are consistent, the terminal may use a same DMRS configuration. However, in a case that a PSFCH is present, an indicated DMRS pattern may collide with a PSFCH resource. Therefore, the terminal needs to specify a method for determining DMRS overheads to ensure consistent DMRS overheads determined by the terminal for initial transmission and retransmission, so as to further ensure a same TBS calculation result for initial transmission and retransmission.

In view of this, in this embodiment of the present disclosure, the terminal may determine the overhead reference value for the DMRS based on at least one of the PSFCH configuration information, SCI, and higher-layer signaling configuration information. In this embodiment of the present disclosure, the terminal may be either a receive terminal or a transmit terminal, that is, both the receive terminal and the transmit terminal can determine the overhead reference value for the DMRS based on at least one of the PSFCH configuration information, SCI, and higher-layer signaling configuration information. In this way, it can be ensured that the DMRS overheads determined by the receive terminal and the transmit terminal are consistent in initial transmission and retransmission. To avoid repetition, the terminal in this embodiment of the present disclosure may be either a receive terminal or a transmit terminal, which is not limited in this embodiment of the present disclosure.

The overhead reference value for the DMRS may be used for determining a TBS.

It should be noted that determining the overhead reference value for the DMRS is mainly for a purpose of maintaining a same value for DMRS overheads used by the receive terminal and the transmit terminal for initial transmission and retransmission, which are not necessarily actual overheads for the DMRS.

The following specifically describes a manner of determining a time-domain overhead reference value for the DMRS.

Optionally, the time-domain overhead reference value for the DMRS is determined based on a pattern of the DMRS.

In this implementation, the terminal may determine the time-domain overhead reference value for the DMRS based on a DMRS pattern.

The DMRS pattern may be a DMRS pattern indicated by PSCCH, or a DMRS pattern indicated by first-stage SCI, or a DMRS pattern configured by using higher-layer signaling, or a DMRS pattern configured by using RRC signaling.

The SL supports configuration of two-stage SCI, the first-stage SCI is carried on PSCCH, and the second-stage SCI is carried on PSSCH. Resource elements (RE) actually occupied by the second-stage SCI may be determined based on a parameter beta indicated by the first-stage SCI. In addition, overheads of the second-stage SCI are related to a TBS to be transmitted.

The DMRS pattern may include a time domain pattern and a frequency domain pattern. Further, the foregoing DMRS pattern used for determining the time-domain overhead reference value for the DMRS may be a time-domain pattern of the DMRS.

On the SL, the time-domain pattern of the DMRS may be shown in Table 1, and time-frequency domain parameters for the DMRS may be shown in Table 2.

TABLE 1

| Number of available symbols for PSSCH | Position of DMRS: Number of symbols for PSCCH being 2, Number of symbols for PSSCH DMRS: 2 | 3 | 4 | Number of symbols for PSCCH being 3, Number of symbols for PSSCH DMRS: 2 | 3 | 4 |
|---|---|---|---|---|---|---|
| 6 | 1, 5 | | | 1, 5 | | |
| 7 | 1, 5 | | | 1, 5 | | |
| 8 | 1, 5 | | | 1, 5 | | |
| 9 | 3, 8 | 1, 4, 7 | | 4, 8 | 1, 4, 7 | |
| 10 | 3, 8 | 1, 4, 7 | | 4, 8 | 1, 4, 7 | |
| 11 | 3, 10 | 1, 5, 9 | 1, 4, 7, 10 | 4, 10 | 1, 5, 9 | 1, 4, 7, 10 |
| 12 | 3, 10 | 1, 5, 9 | 1, 4, 7, 10 | 4, 10 | 1, 5, 9 | 1, 4, 7, 10 |
| 13 | 3, 10 | 1, 6, 11 | 1, 4, 7, 10 | 4, 10 | 1, 6, 11 | 1, 4, 7, 10 |

In Table 1, symbols in a slot are numbered from 0.

TABLE 2

| Port index for PSSCH DMRS | CDM group index | $w_f(k')$ k' = 0 | $w_f(k')$ k' = 1 | $w_t(l')$ l' = 0 | $w_t(l')$ l' = 1 |
|---|---|---|---|---|---|
| 1000 | 0 | +1 | +1 | +1 | +1 |
| 1001 | 0 | +1 | −1 | +1 | +1 |

In Table 2, $w_f$ represents a frequency-domain orthogonal cover code, and $w_t$ represents a time-domain orthogonal cover code.

Optionally, in a case that the pattern of the DMRS is a DMRS pattern indicated by a PSCCH or first-stage SCI, the time-domain overhead reference value for the DMRS is the number of symbols for the DMRS pattern.

In this implementation, the terminal may determine the time-domain overhead reference value for the DMRS based on the DMRS pattern indicated by the PSCCH or the first-stage SCI. For example, if 10 symbols (symbol 0 to symbol 9) are available for the PSSCH and the first-stage SCI indicates using a four-symbol DMRS configuration <1, 4, 7, 10>, the time-domain overhead reference value for the DMRS are 4 symbols in time domain. Even if DMRS symbol 10 is not included in the available symbols for PSSCH, the terminal may still consider DMRS symbol 10 as the time-domain overhead reference value for the DMRS.

Optionally, in a case that the pattern of the DMRS is a DMRS pattern configured by using higher-layer signaling, the time-domain overhead reference value for the DMRS is an average value of the number of symbols for all DMRS patterns configured by using the higher-layer signaling, a round-up value of an average value of the number of symbols for all DMRS patterns configured by using the higher-layer signaling, or a round-down value of an average value of the number of symbols for all DMRS patterns configured by using the higher-layer signaling.

In this implementation, the terminal may determine the time-domain overhead reference value for the DMRS based on the DMRS pattern indicated by higher-layer signaling. For example, the terminal may use the average value of the number of symbols for all the DMRS patterns configured by using the higher-layer signaling as the time-domain overhead reference value for the DMRS, or may round up the average value of the number of symbols for all the DMRS patterns configured by using the higher-layer signaling as the time-domain overhead reference value for the DMRS, or may round down the average value of the number of symbols for all the DMRS patterns configured by using the higher-layer signaling as the time-domain overhead reference value for the DMRS.

Optionally, in a case that only one DMRS pattern is configured by using the higher-layer signaling, the time-domain overhead reference value for the DMRS is the number of symbols for the DMRS pattern configured by using the higher-layer signaling.

In this implementation, if only one DMRS pattern is configured by using the higher-layer signaling such as radio resource control (RRC), the terminal may use the number of symbols for the DMRS pattern configured by the higher-layer signaling as the time-domain overhead reference value for the DMRS.

It should be noted that a plurality of DMRS patterns may be configured for a resource pool by using the higher-layer signaling, and the SCI may indicate one DMRS pattern from the plurality of DMRS patterns configured by using the higher-layer signaling. If only one DMRS pattern is configured by using the higher-layer signaling, the SCI may not need to indicate a DMRS pattern, and the terminal directly uses the DMRS pattern configured in the higher-layer signaling. In view of this, considering that only one DMRS pattern may be configured in the higher-layer signaling, the terminal can use the number of symbols for the DMRS pattern configured in the higher-layer signaling as the time-domain overhead reference value for the DMRS.

The foregoing describes various implementations for determining a time-domain overhead reference value for DMRS by the terminal. The terminal may determine the time-domain overhead reference value for the DMRS by using any one of the implementations, so as to ensure that the DMRS time-domain overheads determined by the terminal are consistent in initial transmission and retransmission.

During determining of the time-domain overhead reference value for the DMRS by the terminal, the terminal may determine the number of symbols for the DMRS based on the indicated DMRS pattern, and use the determined number of symbols to determine the time-domain overhead reference value for the DMRS.

Further, the terminal may determine the time-domain overhead reference value for the DMRS based on an SCI indication or an RRC parameter.

The SCI indication may be an implicit indication, for example, the SCI indication and an indication for PSFCH are jointly coded. Further, in a case that a PSFCH is configured for the resource pool, the number of symbols for the time-domain overhead reference value for the DMRS is a first symbol quantity, that is, the terminal may determine the first symbol quantity as the number of symbols used for calculating the time-domain overhead reference value for the DMRS. In a case that no PSFCH is configured for the resource pool, the number of symbols for the time-domain overhead reference value for the DMRS is a second symbol quantity, that is, the terminal may determine the second symbol quantity as the number of symbols used for calculating the time-domain overhead reference value for the DMRS.

The SCI indication may be an explicit indication. For example, an explicit indication is carried in the first-stage SCI. Assuming that a third symbol quantity is explicitly indicated by the first-stage SCI, the number of symbols for the time-domain overhead reference value for the DMRS is the third symbol quantity, that is, the terminal may determine the third symbol quantity as the number of symbols used for calculating the time-domain overhead reference value for the DMRS.

The following specifically describes a manner of determining a frequency-domain overhead reference value for the DMRS.

Optionally, the determining a frequency-domain overhead reference value for the DMRS includes:

determining a frequency-domain overhead reference value for the DMRS based on a frequency-domain resource occupied by a PSSCH, where the frequency-domain resource occupied by the PSSCH is a frequency-domain resource for data transmission by the terminal or a frequency-domain resource indicated by the first-stage SCI.

Optionally, on a first DMRS symbol, the frequency-domain overhead reference value for the DMRS is 1/N of the frequency-domain resource occupied by the PSSCH, where N is an integer greater than 1.

The first DMRS symbol may be understood as a symbol that carries the DMRS in the indicated DMRS pattern, that is, on any symbol carrying the DMRS, the frequency-domain overhead reference value for the DMRS may be 1/N of the frequency-domain resource occupied by the PSSCH. That is, on any symbol carrying the DMRS, the terminal may determine the frequency-domain overhead reference value for the DMRS as 1/N of the frequency-domain resources occupied by the PSSCH. In other words, on any symbol carrying the DMRS, REs occupied by the DMRS are 1/N of REs of the PSSCH on a single symbol. For example, N may be 2, that is, the frequency-domain overhead reference value for the DMRS may be ½ of the frequency-domain resource occupied by the PSSCH.

Optionally, the frequency-domain resource occupied by the PSSCH is related to the number of subchannels and a subchannel size for the terminal.

Assuming that the number of subchannels for the terminal is $M_{SCH}$ and the subchannel size is $N_{PRB}$, the frequency-domain overhead reference value for the DMRS may be $½*M_{SCH}*N_{PRB}*N_{SC}$ on each DMRS symbol.

$N_{SC}$ is the number of subcarriers in a physical resource block (PRB), for example, $N_{SC}$ is 12. It should be noted that the frequency-domain overhead reference value for the DMRS is a concept of REs, and the overhead reference value for the DMRS is also in unit of REs because the DMRS is mapped in unit of REs.

In the foregoing implementation of determining the frequency-domain overhead reference value for the DMRS based on the frequency-domain resource occupied by the PSSCH, the terminal does not consider an overlapping portion between the DMRS and the PSCCH and a possible overlapping portion between the DMRS and the PSFCH. In this case, the terminal may deduct part of overheads. Therefore, regardless of REs consumed by the DMRS and PSFCH during actual transmission, the terminal can obtain a same frequency-domain overhead reference value for the DMRS during TBS calculation for initial transmission and retransmission, so as to obtain a same TBS.

In the foregoing implementation of determining the frequency-domain overhead reference value for the DMRS based on the frequency-domain resource occupied by the PSSCH, regardless of whether the PSFCH is enabled in the resource pool and what is the subchannel size, the frequency-domain overhead reference value for the DMRS determined by the terminal is the same for each DMRS symbol.

Figure 3:
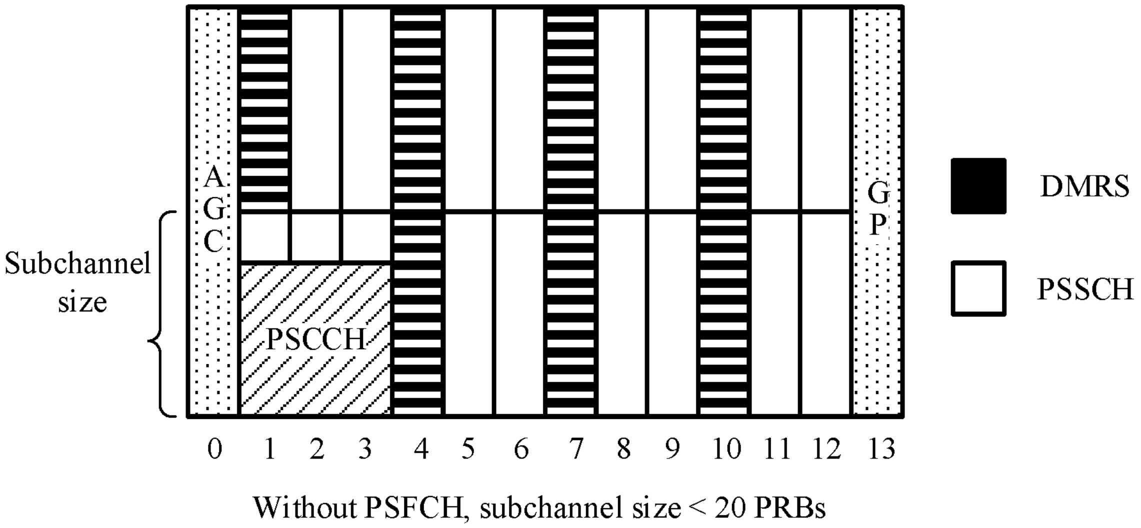
FIG. 3 to FIG. 6 show four types of configuration information on SL according to an embodiment of the present disclosure.
Figure 4:
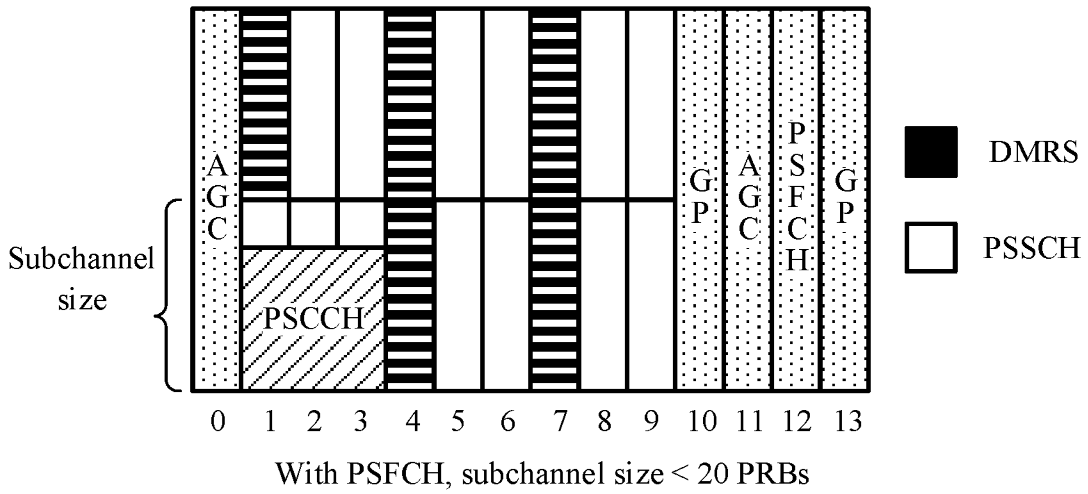
Figure 5:
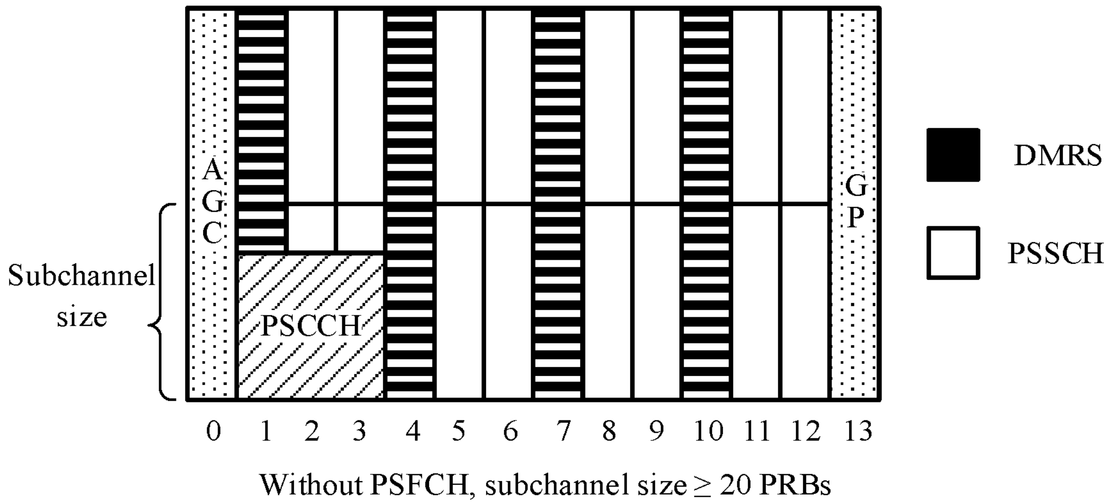
Figure 6:
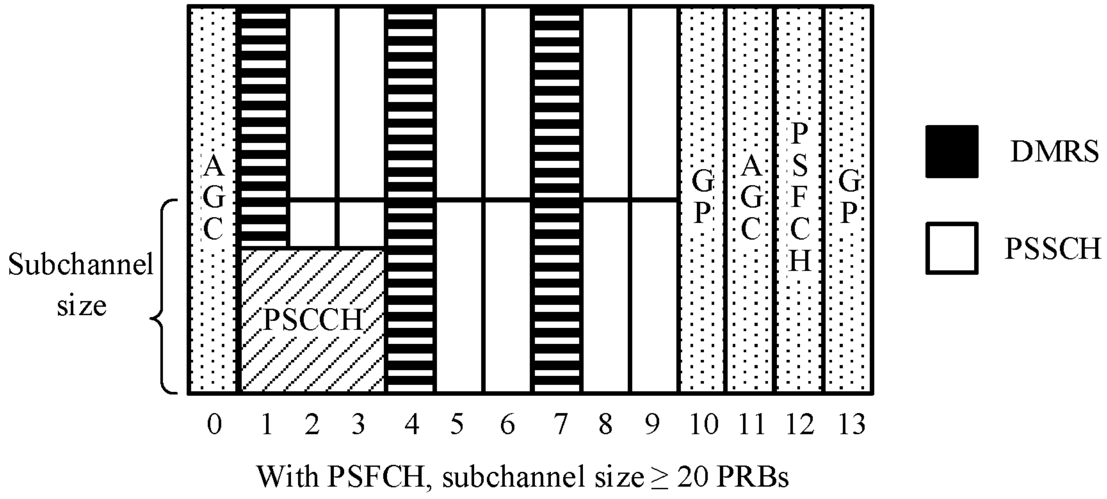

For example, FIG. 3 to FIG. 6 show four types of configuration information on SL. FIG. 3 shows configuration information in a case that no PSFCH is present and a subchannel size is less than 20 PRBs; FIG. 4 shows configuration information in a case that the PSFCH is present and a subchannel size is less than 20 PRBs; FIG. 5 shows configuration information in a case that no PSFCH is present and a subchannel size is greater than or equal to 20 PRBs; and FIG. 6 shows configuration information in a case that the PSFCH is present and a subchannel size is greater than or equal to 20 PRBs.

Figure 7:
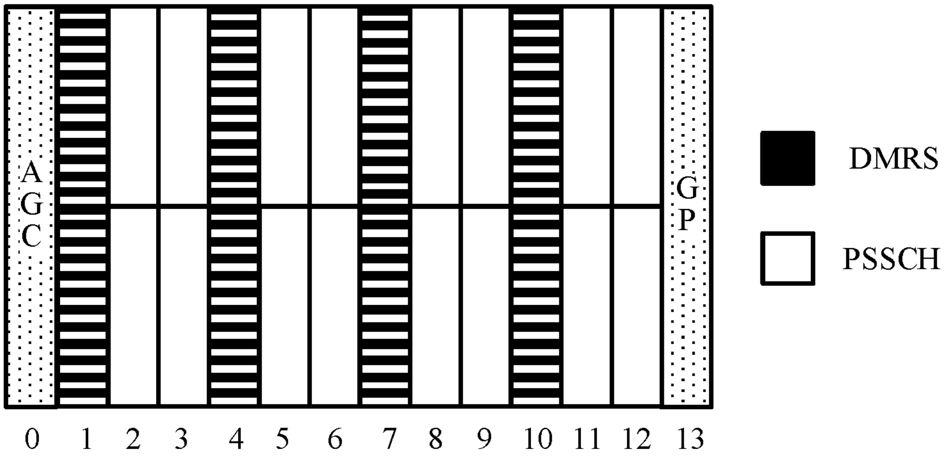
FIG. 7 is an example diagram of a frequency-domain overhead reference value for DMRS that is determined based on a frequency-domain resource occupied by PSSCH corresponding to FIG. 3 to FIG. 6.

Assuming that the SCI or PSCCH indicates a DMRS pattern being <1, 4, 7, 10>, the frequency-domain overhead reference value for the DMRS determined by the terminal is the same on each DMRS symbol, as shown in FIG. 7. It can be seen that, in FIG. 3 to FIG. 6, regardless of whether the PSFCH is enabled in the resource pool and what is the subchannel size, the terminal determines the frequency-domain overhead reference value for the DMRS on each DMRS symbol based on the frequency-domain resource occupied by the PSSCH. Assuming that the number of subchannels for the terminal is $M_{SCH}$ and the subchannel size is $N_{PRB}$, the frequency-domain overhead reference value for the DMRS on each DMRS symbol in FIG. 7 is $\frac{1}{2}*M_{SCH}*N_{PRB}*N_{SC}$.

The foregoing is an implementation of determining the frequency-domain overhead reference value for the DMRS based on the frequency-domain resource occupied by the PSSCH.

If some indicated symbols of the DMRS are not mapped within an entire resource range of the PSSCH (for example, overlapping with other channels) for some causes, the terminal may alternatively calculate the frequency-domain overhead reference value for the DMRS based on the number of actually mapped REs of the DMRS.

In view of this, the following provides an implementation in which the terminal calculates the frequency-domain overhead reference value for the DMRS based on the number of actually mapped REs of the DMRS.

Optionally, in a case that a second DMRS symbol overlaps a PSCCH symbol, a frequency-domain overhead reference value for the DMRS on the second DMRS symbol is an overhead reference value excluding a first preset value.

In this implementation, when the DMRS and the PSCCH are mapped to a same symbol (that is, the second DMRS symbol), the frequency-domain overhead reference value for the DMRS on the second DMRS symbol may be an overhead reference value excluding the first preset value. For the four types of configuration information on SL shown in FIG. 3 to FIG. 6, the second DMRS symbol is symbol 1, that is, the DMRS overlaps the PSCCH on symbol 1.

In this embodiment of the present disclosure, the first preset value may be a value predefined by a protocol, a value configured by higher-layer signaling, or a value indicated by SCI, which is not limited in this embodiment of the present disclosure.

It should be noted that, the frequency-domain overhead reference value for the DMRS on the second DMRS symbol is an overhead reference value excluding the first preset value. It can be understood that the terminal does not consider the first preset value during determining of the frequency-domain overhead reference value for the DMRS on the second DMRS symbol. It can be also understood that the terminal does not calculate the first preset value during determining of the frequency-domain overhead reference value for the DMRS on the second DMRS symbol.

On other DMRS symbols than the second DMRS symbol, the frequency-domain overhead reference value for the DMRS may be determined according to the foregoing implementation, that is, on any one of other DMRS symbols, the frequency-domain overhead reference value for the DMRS may be determined based on the frequency-domain resource occupied by the PSSCH. For example, assuming that the number of subchannels for the terminal is $M_{SCH}$ and the subchannel size is $N_{PRB}$, the frequency-domain overhead reference value for the DMRS on any one of other DMRS symbols may be $\frac{1}{2}*M_{SCH}*N_{PRB}*N_{SC}$.

Optionally, the first preset value is a size of a subchannel in which the PSCCH is located, or is a size of a subchannel in a resource pool in which the terminal is located, or is a size of a frequency-domain resource occupied by the PSCCH.

In this implementation, the first preset value may be the size of the subchannel in which the PSCCH is located, that is, the frequency-domain overhead reference value for the DMRS on the second DMRS symbol is an overhead reference value excluding the size of the subchannel in which the PSCCH is located. For example, assuming that the number of subchannels for the terminal is $M_{SCH}$ and the subchannel size is $N_{PRB}$, the frequency-domain overhead reference value for the DMRS on the second DMRS symbol is $\frac{1}{2}*(N_{PRB}*M_{SCH}-N_{PRB})*N_{SC}$. The first preset value may alternatively be the size of the subchannel in the resource pool in which the terminal is located.

The first preset value may alternatively be the size of the frequency-domain resource occupied by the PSCCH, that is, the frequency-domain overhead reference value for the DMRS on the second DMRS symbol is an overhead reference value excluding the frequency-domain resource occupied by the PSCCH. For example, assuming that the number of subchannels for the terminal is $M_{SCH}$, the subchannel size is $N_{PRB}$, and the frequency-domain resource occupied by the PSCCH is $P_{PRB}$, the frequency-domain overhead reference value for the DMRS on the second DMRS symbol is $\frac{1}{2}*(N_{PRB}*M_{SCH}-P_{PRB})*N_{SC}$.

Optionally, in a case that a subchannel size for the terminal is less than a second preset value, the first preset value is the size of the subchannel in which the PSCCH is located or the size of the subchannel in the resource pool in which the terminal is located.

The second preset value may be 20 PRBs. That is, if the subchannel size $N_{PRB}$ for the terminal is less than 20 PRBs, that is, as shown in the SL configuration in FIG. 3 and FIG. 4, the frequency-domain overhead reference value for the DMRS on the second DMRS symbol is an overhead reference value excluding the size of the subchannel in which the PSCCH is located, or an overhead reference value excluding of the size of the subchannel of the resource pool in which the terminal is located.

Optionally, in a case that a subchannel size for the terminal is greater than or equal to a second preset value, the first preset value is the size of the frequency-domain resource occupied by the PSCCH.

The second preset value may be 20 PRBs. That is, if the subchannel size $N_{PRB}$ for the terminal is greater than or equal to 20 PRBs, that is, as shown in the SL configuration in FIG. 5 and FIG. 6, the frequency-domain overhead reference value for the DMRS on the second DMRS symbol is an overhead reference value excluding the frequency-domain resource occupied by the PSCCH.

For the two types of configuration information on SL shown in FIG. 3 and FIG. 4, the subchannel size $N_{PRB}$ for the terminal is less than 20 PRBs; in this case, the frequency-domain overhead reference value for the DMRS on symbol 1 is $\frac{1}{2}*(N_{PRB}*M_{SCH}-N_{PRB})*N_{SC}$, and the frequency-domain overhead reference value on remaining indicated DMRS symbols is $\frac{1}{2}*M_{SCH}*N_{PRB}*N_{SC}$.

Figure 8:
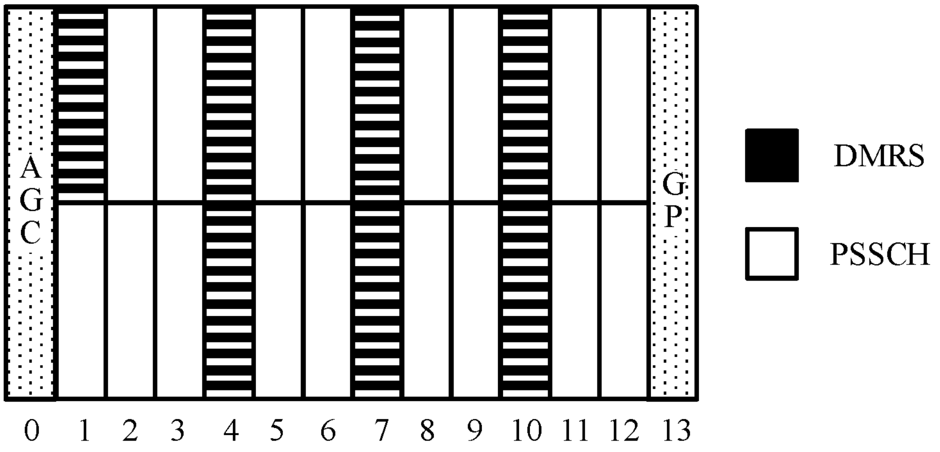
FIG. 8 is an example diagram of a frequency-domain overhead reference value for DMRS on a second DMRS symbol excluding a first preset value corresponding to FIG. 3 to FIG. 6.

As shown in FIG. 8, if the DMRS pattern indicated by the SCI is <1, 4, 7, 10> and the PSFCH is configured in the resource pool, the frequency-domain overhead reference value for the DMRS determined by the terminal is a frequency-domain overhead reference value on symbol 1 plus a frequency-domain overhead reference value on symbols 4, 7, and 10. That is, the overhead reference value for the DMRS is $\frac{1}{2}*(N_{PRB}*M_{SCH}-N_{PRB})*N_{SC}+3*\frac{1}{2}*M_{SCH}*N_{PRB}*N_{SC}$, that is, the frequency-domain overhead reference value for the DMRS is $(2*M_{SCH}*N_{PRB}-\frac{1}{2}*N_{PRB})*N_{SC}$.

Optionally, in a case that the DMRS includes a third DMRS symbol and no PSSCH is mapped on the third DMRS symbol, the frequency-domain overhead reference value for the DMRS on the third DMRS symbol is a third preset value.

The third DMRS symbol is determined based on the number of available PSSCH symbols and an indicated DMRS pattern.

In this implementation, when no PSSCH is mapped on the indicated DMRS symbol or when the indicated DMRS symbol overlaps the GP, AGC, PSFCH, and the like, the DMRS symbol is a third DMRS symbol. If the DMRS pattern indicated by the SCI is <1, 4, 7, 10>, for the two types of configuration information on SL shown in FIG. 4 and FIG. 6, symbol 10 has no PSSCH mapped but overlaps the GP, and symbol 10 is the third DMRS symbol.

In this implementation, the frequency-domain overhead reference value for the DMRS on the third DMRS symbol may be a third preset value. The third preset value may be a value predefined by a protocol, a value configured by higher-layer signaling, or a value indicated by SCI, which is not limited in this embodiment of the present disclosure.

Further, the third preset value is 1/N of a frequency-domain resource occupied by a PSSCH, where N is an integer greater than 1; and the frequency-domain resource occupied by the PSSCH is a frequency-domain resource for data transmission by the terminal or a frequency-domain resource indicated by the first-stage SCI.

For example, assuming that the number of subchannels for the terminal is $M_{SCH}$ and the subchannel size is $N_{PRB}$, the third preset value may be $(\frac{1}{2}*M_{SCH}*N_{PRB})*N_{SC}$.

On DMRS symbols other than the third DMRS symbol, the frequency-domain overhead reference value for the DMRS may be determined according to any one of the foregoing implementations. For example, on other DMRS symbols, the frequency-domain overhead reference value for the DMRS may be determined based on the frequency-domain resource occupied by the PSSCH. For another example, for a DMRS symbol overlapping a PSCCH symbol, the frequency-domain overhead reference value for the DMRS may be an overhead reference value excluding the first preset value.

Optionally, in a case that a cyclic prefix (CP) is a normal cyclic prefix (NCP), the third DMRS symbol is DMRS symbol 10; or in a case that a cyclic prefix is an extended cyclic prefix (extended CP, ECP), the third DMRS symbol is DMRS symbol 8, DMRS symbol 9, or DMRS symbol 10.

FIG. 3 to FIG. 6 all show the four types of configuration information on SL with a cyclic prefix being NCP.

If a protocol-defined cyclic prefix is NCP and the DMRS pattern includes symbol 10, the frequency-domain overhead reference value for the DMRS on symbol 10 may be $(\frac{1}{2}*M_{SCH}*N_{PRB})*N_{SC}$, and the frequency-domain overhead reference value on other DMRS symbols may be a value obtained based on REs carrying the DMRS on each DMRS symbol.

If the protocol-predefined cyclic prefix is ECP and the DMRS pattern includes symbol 8, symbol 9, or symbol 10, the frequency-domain overhead reference value for the DMRS on symbol 8, symbol 9, or symbol 10 may be $\frac{1}{2}*M_{SCH}*N_{PRB}*N_{SC}$, and the frequency-domain overhead reference value on other DMRS symbols may be a value obtained based on REs carrying the DMRS on each DMRS symbol.

Figure 9:
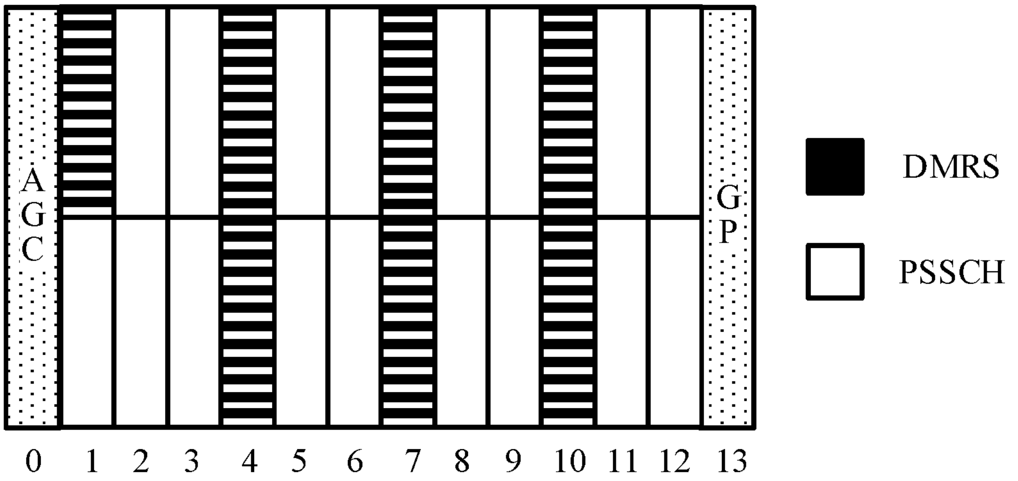
FIG. 9 is an example diagram of a frequency-domain overhead reference value for DMRS corresponding to FIG. 3 and FIG. 4.
Figure 10:
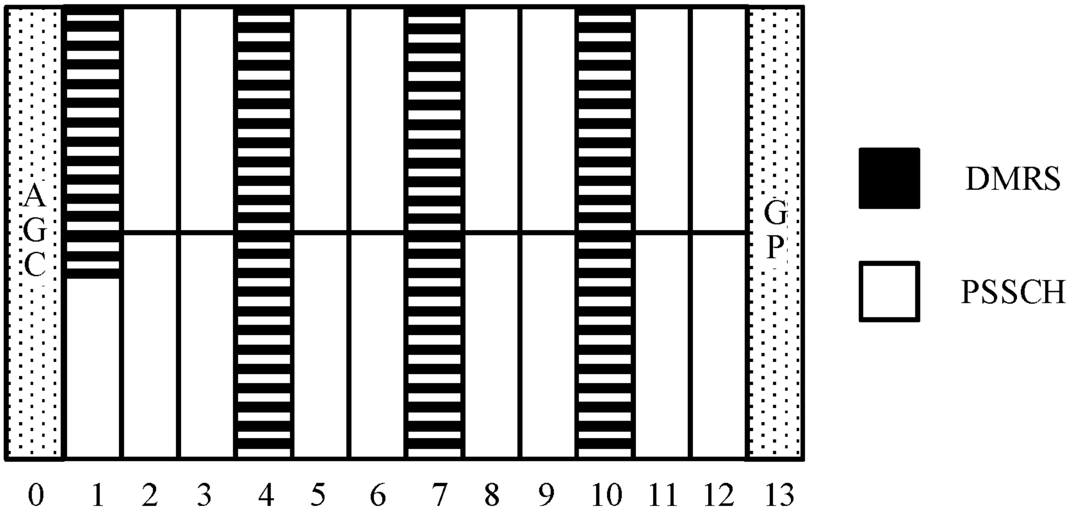
FIG. 10 is an example diagram of a frequency-domain overhead reference value for DMRS corresponding to FIG. 5 and FIG. 6.

If the protocol-predefined cyclic prefix is NCP, for the four types of configuration information shown in FIG. 3 to FIG. 6, the frequency-domain overhead reference value for the DMRS in FIG. 3 and FIG. 4 can be calculated according to FIG. 9, and the frequency-domain overhead reference value for the DMRS in FIG. 5 and FIG. 6 can be calculated according to FIG. 10.

Optionally, in a case that the PSFCH is configured for the resource pool, the number of PSSCH symbols for calculating the TBS includes the number of PSFCH symbols.

It should be noted that various optional implementations described in this embodiment of the present disclosure may be implemented in combination with each other or may be implemented independently, which is not limited in the embodiments of the present disclosure.

In this embodiment of the present disclosure, the terminal may determine the overhead reference value for the DMRS based on at least one of the PSFCH configuration information, the SCI, and higher-layer signaling configuration information. In this way, no matter whether initial transmission and retransmission are located in or not located in a slot carrying the PSFCH, the overhead reference values for the DMRS determined by the terminal for initial transmission and retransmission can keep consistent, so as to ensure a same TBS calculation result for initial transmission and retransmission, thereby implementing merging of initial transmission and retransmission.

Figure 11:
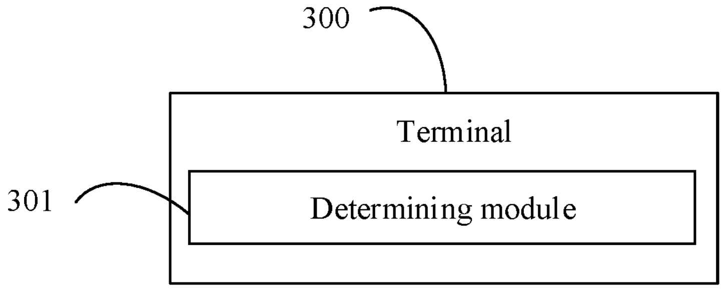
FIG. 11 is a schematic structural diagram of a terminal according to an embodiment of the present disclosure.

FIG. 11 is a structural diagram of a terminal according to an embodiment of the present disclosure. As shown in FIG. 11, the terminal 300 includes:

a determining module 301, configured to determine an overhead reference value for DMRS based on first information, where the first information includes at least one of physical sidelink feedback channel PSFCH configuration information, sidelink control information SCI, and higher-layer signaling configuration information, and the overhead reference value includes a time-domain overhead reference value and a frequency-domain overhead reference value.

Optionally, the time-domain overhead reference value for the DMRS is determined based on a pattern of the DMRS.

Optionally, in a case that the pattern of the DMRS is a DMRS pattern indicated by a physical sidelink control channel PSCCH or first-stage SCI, the time-domain overhead reference value for the DMRS is the number of symbols for the DMRS pattern.

Optionally, in a case that the pattern of the DMRS is a DMRS pattern configured by using higher-layer signaling, the time-domain overhead reference value for the DMRS is an average value of the number of symbols for all DMRS patterns configured by using the higher-layer signaling, a round-up value of an average value of the number of symbols for all DMRS patterns configured by using the higher-layer signaling, or a round-down value of an average value of the number of symbols for all DMRS patterns configured by using the higher-layer signaling.

Optionally, in a case that only one DMRS pattern is configured by using radio resource control RRC, the time-domain overhead reference value for the DMRS is the number of symbols for the DMRS pattern configured by using RRC signaling.

Optionally, in a case that a PSFCH is configured for the resource pool, the number of symbols for the time-domain overhead reference value for the DMRS is a first symbol quantity.

In a case that no PSFCH is configured for the resource pool, the number of symbols for the time-domain overhead reference value for the DMRS is a second symbol quantity.

Optionally, the number of symbols for the time-domain overhead reference value for the DMRS is a third symbol quantity, and the third symbol quantity is a quantity indicated by first-stage SCI.

Optionally, the determining module 301 is specifically configured to:

determine a frequency-domain overhead reference value for the DMRS based on a frequency-domain resource occupied by a physical sidelink shared channel PSSCH, where the frequency-domain resource occupied by the PSSCH is a frequency-domain resource for data transmission by the terminal or a frequency-domain resource indicated by the first-stage SCI.

Optionally, on a first DMRS symbol, the frequency-domain overhead reference value for the DMRS is 1/N of the frequency-domain resource occupied by the PSSCH, where N is an integer greater than 1.

Optionally, the frequency-domain resource occupied by the PSSCH is related to the number of subchannels and a subchannel size for the terminal.

Optionally, in a case that a second DMRS symbol overlaps a PSCCH symbol, a frequency-domain overhead reference value for the DMRS on the second DMRS symbol is an overhead reference value excluding a first preset value.

Optionally, the first preset value is a size of a subchannel in which the PSCCH is located, or is a size of a subchannel in a resource pool in which the terminal is located, or is a size of a frequency-domain resource occupied by the PSCCH.

Optionally, in a case that a subchannel size for the terminal is less than a second preset value, the first preset value is the size of the subchannel in which the PSCCH is located or the size of the subchannel in the resource pool in which the terminal is located.

Optionally, in a case that a subchannel size for the terminal is greater than or equal to a second preset value, the first preset value is the size of the frequency-domain resource occupied by the PSCCH.

Optionally, in a case that the DMRS includes a third DMRS symbol and no PSSCH is mapped on the third DMRS symbol, the frequency-domain overhead reference value for the DMRS on the third DMRS symbol is a third preset value.

Optionally, the third DMRS symbol is determined based on the number of available PSSCH symbols and an indicated DMRS pattern.

Optionally, the third preset value is 1/N of a frequency-domain resource occupied by a PSSCH, where N is an integer greater than 1; and the frequency-domain resource occupied by the PSSCH is a frequency-domain resource for data transmission by the terminal or a frequency-domain resource indicated by the first-stage SCI.

Optionally, in a case that a cyclic prefix is a normal cyclic prefix NCP, the third DMRS symbol is DMRS symbol 10; or in a case that a cyclic prefix is an extended cyclic prefix ECP, the third DMRS symbol is DMRS symbol 8, DMRS symbol 9, or DMRS symbol 10.

Optionally, the overhead reference value for the DMRS is used for determining a transport block size TBS.

Optionally, in a case that the PSFCH is configured for a resource pool, the number of PSSCH symbols for determining the TBS includes the number of PSFCH symbols.

It should be noted that the terminal 300 in this embodiment of the present disclosure may be a terminal in any implementation of the method embodiments. Any implementation of the terminal in the method embodiments can be implemented by the terminal 300 in this embodiment of the present disclosure, with the same beneficial effects achieved. To avoid repetition, details are not described herein again.

Figure 12:
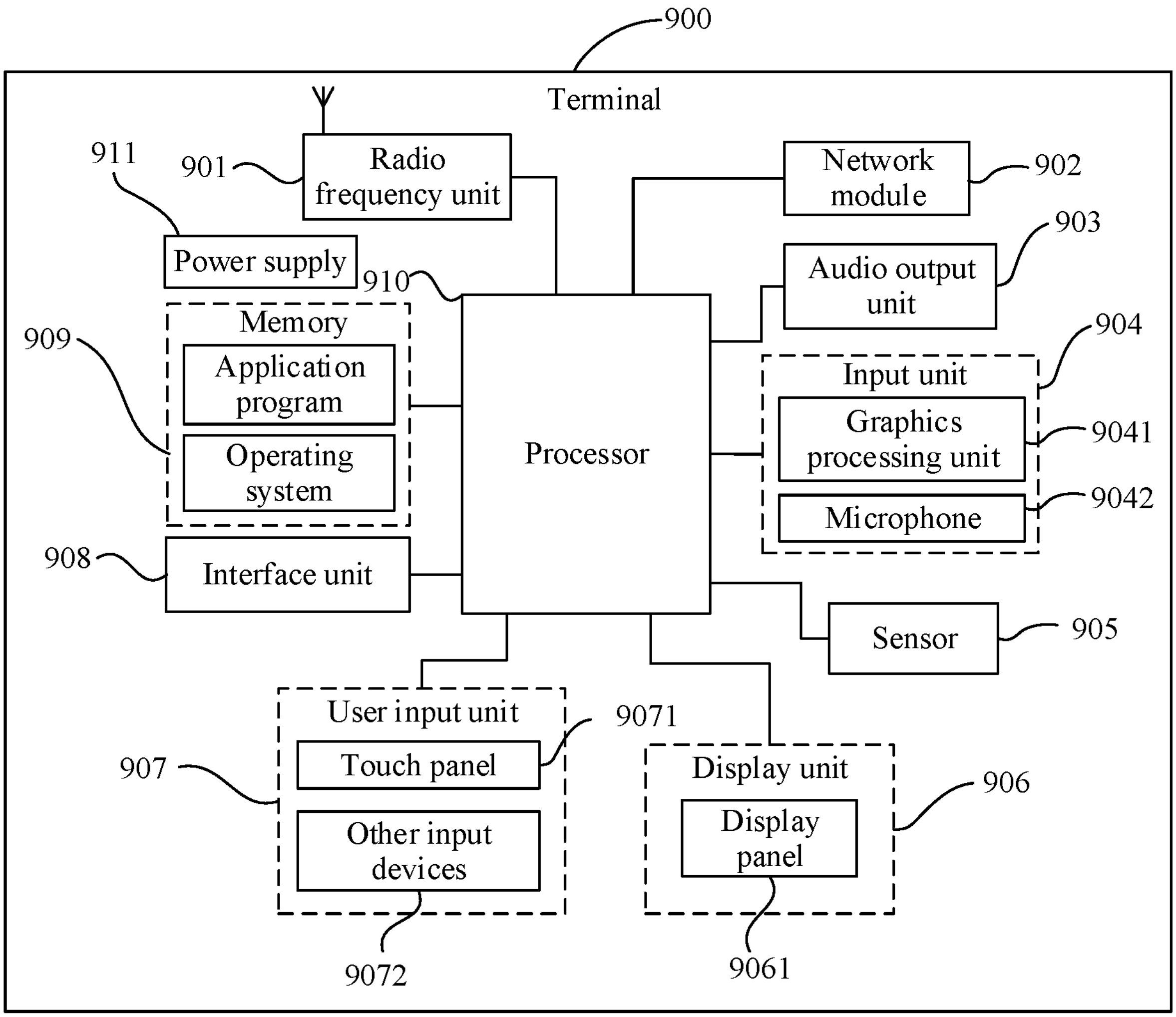
FIG. 12 is a schematic structural diagram of hardware of a terminal according to an embodiment of the present disclosure.

FIG. 12 is a schematic structural diagram of hardware of a terminal for implementing the embodiments of the present disclosure. The terminal 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the terminal shown in FIG. 12 does not constitute any limitation on the terminal. The terminal may include more or fewer components than those shown in the figure, or a combination of some components, or the components disposed differently. In this embodiment of the present disclosure, the terminal includes, but is not limited to, a mobile phone, a tablet computer, a laptop computer, a personal digital assistant, an in-vehicle terminal, a wearable device, a pedometer, and the like.

The processor 910 is configured to:

determine an overhead reference value for DMRS based on first information, where the first information includes at least one of physical sidelink feedback channel PSFCH configuration information, sidelink control information SCI, and higher-layer signaling configuration information, and the overhead reference value includes a time-domain overhead reference value and a frequency-domain overhead reference value.

Optionally, the time-domain overhead reference value for the DMRS is determined based on a pattern of the DMRS.

Optionally, in a case that the pattern of the DMRS is a DMRS pattern indicated by a physical sidelink control channel PSCCH or first-stage SCI, the time-domain overhead reference value for the DMRS is the number of symbols for the DMRS pattern.

Optionally, in a case that the pattern of the DMRS is a DMRS pattern configured by using higher-layer signaling, the time-domain overhead reference value for the DMRS is an average value of the number of symbols for all DMRS patterns configured by using the higher-layer signaling, a round-up value of an average value of the number of symbols for all DMRS patterns configured by using the higher-layer signaling, or a round-down value of an average value of the number of symbols for all DMRS patterns configured by using the higher-layer signaling.

Optionally, in a case that only one DMRS pattern is configured by using radio resource control RRC, the time-domain overhead reference value for the DMRS is the number of symbols for the DMRS pattern configured by using RRC signaling.

Optionally, in a case that the PSFCH is configured for the resource pool, the number of symbols for the time-domain overhead reference value for the DMRS is a first symbol quantity.

In a case that no PSFCH is configured for the resource pool, the number of symbols for the time-domain overhead reference value for the DMRS is a second symbol quantity.

Optionally, the number of symbols for the time-domain overhead reference value for the DMRS is a third symbol quantity, and the third symbol quantity is a quantity indicated by first-stage SCI.

Optionally, the processor 910 is further configured to:

determine a frequency-domain overhead reference value for the DMRS based on a frequency-domain resource occupied by a physical sidelink shared channel PSSCH, where the frequency-domain resource occupied by the PSSCH is a frequency-domain resource for data transmission by the terminal or a frequency-domain resource indicated by the first-stage SCI.

Optionally, on a first DMRS symbol, the frequency-domain overhead reference value for the DMRS is 1/N of the frequency-domain resource occupied by the PSSCH, where N is an integer greater than 1.

Optionally, the frequency-domain resource occupied by the PSSCH is related to the number of subchannels and a subchannel size for the terminal.

Optionally, in a case that a second DMRS symbol overlaps a PSCCH symbol, a frequency-domain overhead reference value for the DMRS on the second DMRS symbol is an overhead reference value excluding a first preset value.

Optionally, the first preset value is a size of a subchannel in which the PSCCH is located, or is a size of a subchannel in a resource pool in which the terminal is located, or is a size of a frequency-domain resource occupied by the PSCCH.

Optionally, in a case that a subchannel size for the terminal is less than a second preset value, the first preset value is the size of the subchannel in which the PSCCH is located or the size of the subchannel in the resource pool in which the terminal is located.

Optionally, in a case that a subchannel size for the terminal is greater than or equal to a second preset value, the first preset value is the size of the frequency-domain resource occupied by the PSCCH.

Optionally, in a case that the DMRS includes a third DMRS symbol and no PSSCH is mapped on the third DMRS symbol, the frequency-domain overhead reference value for the DMRS on the third DMRS symbol is a third preset value.

Optionally, the third DMRS symbol is determined based on the number of available PSSCH symbols and an indicated DMRS pattern.

Optionally, the third preset value is 1/N of a frequency-domain resource occupied by a PSSCH, where N is an integer greater than 1; and the frequency-domain resource occupied by the PSSCH is a frequency-domain resource for data transmission by the terminal or a frequency-domain resource indicated by the first-stage SCI.

Optionally, in a case that a cyclic prefix is a normal cyclic prefix NCP, the third DMRS symbol is DMRS symbol 10; or in a case that a cyclic prefix is an extended cyclic prefix ECP, the third DMRS symbol is DMRS symbol 8, DMRS symbol 9, or DMRS symbol 10.

Optionally, the overhead reference value for the DMRS is used for determining a transport block size TBS.

Optionally, in a case that the PSFCH is configured for a resource pool, the number of PSSCH symbols for determining the TBS includes the number of PSFCH symbols.

It should be noted that the terminal 900 in this embodiment may be the terminal in any implementation of the method embodiment of the embodiments of the present disclosure, and any implementation of the terminal in the method embodiment of the embodiments of the present disclosure may be implemented by the terminal 900 in this embodiment, with same beneficial effects achieved. Details are not described herein again.

It should be understood that in this embodiment of the present disclosure, the radio frequency unit 901 may be configured to: receive and transmit signals in an information receiving/sending process or a call process; and specifically, after receiving downlink data from a base station, transmit the downlink information to the processor 910 for processing, and in addition, transmit uplink data to the base station. Generally, the radio frequency unit 901 includes but is not limited to an antenna, at least one amplifier, a transceiver, a coupler, a low noise amplifier, a duplexer, and the like. In addition, the radio frequency unit 901 may also communicate with a network and other devices via a wireless communications system.

The terminal provides a user with wireless broadband internet access through the network module 902, for example, helping the user to send and receive e-mails, browse web pages, and access streaming media.

The audio output unit 903 may convert audio data received by the radio frequency unit 901 or the network module 902 or stored in the memory 909 into an audio signal and output the audio signal as a sound. Furthermore, the audio output unit 903 may also provide audio output (for example, a call signal received sound or a message received sound) related to a specific function performed by the terminal 900. The audio output unit 903 includes a speaker, a buzzer, a receiver, and the like.

The input unit 904 is configured to receive an audio or video signal. The input unit 904 may include a graphics processing unit (GPU) 9041 and a microphone 9042. The graphics processing unit 9041 processes image data of a still picture or a video obtained by an image capture apparatus (for example, a camera) in an image capture mode or a video capture mode. A processed image frame may be displayed on the display unit 906. The image frame processed by the graphics processing unit 9041 may be stored in the memory 909 (or another storage medium) or be transmitted by the radio frequency unit 901 or the network module 902. The microphone 9042 is capable of receiving sounds and processing such sounds into audio data. The processed audio data may be converted in a telephone call mode into a format that can be transmitted by the radio frequency unit 901 to a mobile communications base station, for outputting.

The terminal 900 further includes at least one sensor 905, for example, an optical sensor, a motion sensor, and other sensors. Specifically, the optical sensor includes an ambient light sensor and a proximity sensor. The ambient light sensor may adjust luminance of a display panel 9061 based on brightness of ambient light, and the proximity sensor may turn off the display panel 9061 and backlighting when the terminal 900 moves to an ear. As a type of motion sensor, an accelerometer sensor can detect magnitudes of accelerations in all directions (usually three axes), can detect a magnitude and a direction of gravity when the terminal is in a static state, and can be applied to posture recognition (such as screen switching between portrait and landscape, related games, and magnetometer posture calibration) of the terminal, functions related to vibration recognition (such as pedometer and tapping), and the like. The sensor 905 may also include a fingerprint sensor, a pressure sensor, an iris sensor, a molecular sensor, a gyroscope, a barometer, a hygrometer, a thermometer, an infrared sensor, and the like. Details are not described herein.

The display unit 906 is configured to display information input by the user or information provided to the user. The display unit 906 may include the display panel 9061. The display panel 9061 may be configured in a form of a liquid crystal display (LCD), an organic light-emitting diode (OLED), or the like.

The user input unit 907 may be configured to: receive a digit or character information that is input, and generate signal input related to user settings and function control of the terminal. Specifically, the user input unit 907 may include a touch panel 9071 and other input devices 9072. The touch panel 9071 is also referred to as a touchscreen and can collect a touch operation (such as an operation performed by the user on the touch panel 9071 or near the touch panel 9071 with a finger or by using any proper object or accessory such as a stylus) of the user on or near the touch panel 9071. The touch panel 9071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 910, and can receive a command transmitted by the processor 910 and execute the command. In addition, the touch panel 9071 may be implemented in a plurality of forms, for example, as a resistive, capacitive, infrared, or surface acoustic wave touch panel. The user input unit 907 may further include the other input devices 9072 in addition to the touch panel 9071. Specifically, the other input devices 9072 may include but are not limited to a physical keyboard, a function key (such as a volume control key or an on/off key), a trackball, a mouse, and a joystick. Details are not described herein.

Further, the touch panel 9071 may cover the display panel 9061. When detecting a touch operation on or near the touch panel 9071, the touch panel 9071 transmits the touch operation to the processor 910 to determine a type of a touch event. Then, the processor 910 provides a corresponding visual output on the display panel 9061 based on the type of the touch event. In FIG. 12, the touch panel 9071 and the display panel 9061 serve as two independent components to implement input and output functions of the terminal. In some embodiments, however, the touch panel 9071 may be integrated with the display panel 9061 to implement the input and output functions of the terminal. This is not specifically limited herein.

The interface unit 908 is an interface between an external apparatus and the terminal 900. For example, the external apparatus may include a wired or wireless headphone port, an external power (or battery charger) port, a wired or wireless data port, a memory card port, a port for connecting an apparatus provided with a recognition module, an audio input/output (Input/Output, I/O) port, a video I/O port, an earphone port, and the like. The interface unit 908 may be configured to: receive input (for example, data information and power) from the external apparatus, and transmit the received input to one or more elements in the terminal 900, or may be configured to transmit data between the terminal 900 and the external apparatus.

The memory 909 may be configured to store software programs and various data. The memory 909 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 909 may include a high-speed random access memory, and may further include a non-volatile memory such as at least one disk storage device, a flash memory device, or another volatile solid-state storage device.

The processor 910 is a control center of the terminal that connects various parts of the entire terminal by using various interfaces or lines. The processor 910 performs various functions of the terminal and processes data by running or executing software programs and modules stored in the memory 909 and calling data stored in the memory 909, so as to perform overall monitoring on the terminal. The processor 910 may include one or more processing units. Preferably, the processor 910 may integrate an application processor and a modem processor. The application processor mainly processes the operating system, a user interface, an application program, and the like. The modem processor mainly processes wireless communication. It can be understood that the modem processor may alternatively be not integrated in the processor 910.

The terminal 900 may further include the power supply 911 (such as a battery) supplying power to each component. Preferably, the power supply 911 may be logically connected to the processor 910 by using a power management system, so that functions such as charge and discharge management and power consumption management are implemented by using the power management system.

In addition, the terminal 900 includes some functional modules that are not illustrated. Details are not described herein.

Preferentially, an embodiment of the present disclosure further provides a terminal, including a processor 910, a memory 909, and a computer program stored in the memory 909 and capable of running on the processor 910. When the computer program is executed by the processor 910, the processes of the foregoing embodiment of the method for determining an overhead reference value for DMRS can be implemented, with the same technical effects achieved. To avoid repetition, details are not described herein again.

It should be noted that the terminal 900 in this embodiment may be the terminal in any implementation of the method embodiment of the embodiments of the present disclosure, and any implementation of the terminal in the method embodiment of the embodiments of the present disclosure may be implemented by the terminal 900 in this embodiment, with same beneficial effects achieved. Details are not described herein again.

An embodiment of the present disclosure further provides a computer-readable storage medium, where a computer program is stored in the computer-readable storage medium. When the computer program is executed by a processor, the processes of the foregoing embodiment corresponding to the terminal or the network side can be implemented, with same technical effects achieved. To avoid repetition, details are not described herein again. The computer-readable storage medium is, for example, a read-only memory (y, ROM), a random access memory (RAM), a magnetic disk, or an optical disc.

It should be noted that the terms "comprise", "include", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communications connections may be implemented by using some interfaces. The indirect couplings or communications connections between apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on an actual requirement, to achieve the objectives of the solutions in the embodiments.

In addition, functional units in the embodiments of this disclosure may be integrated into one processing unit, or each of the units may exist alone physically, or two or more units are integrated into one unit.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of the present disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

A person of ordinary skill in the art may understand that all or some of the processes of the methods in the embodiments may be implemented by a computer program controlling relevant hardware. The program may be stored in a computer readable storage medium. When the program runs, the processes of the method embodiments may be included. The foregoing storage medium may be a magnetic disk, an optical disc, a read-only memory (y, ROM), a random access memory (RAM), or the like.

It can be understood that the embodiments described in this disclosure may be implemented by hardware, software, firmware, middleware, microcode, or a combination thereof. For hardware implementation, a module, a unit, a sub-unit, a sub-module, and the like may be implemented in one or more application specific integrated circuits (ASIC), digital signal processors (Digital Signal Processor, DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure is subject to the protection scope of the claims.

What is claimed is:

1. A method for determining an overhead reference value for demodulation reference signal (DMRS), applied to a terminal and comprising:

determining an overhead reference value for DMRS based on first information, wherein the first information comprises at least one of physical sidelink feedback channel (PSFCH) configuration information, sidelink control information (SCI), or higher-layer signaling configuration information, and the overhead reference value comprises a time-frequency domain overhead reference value, wherein the time-frequency domain overhead reference value for the DMRS is determined based on a pattern of the DMRS, when the pattern of the DMRS is a DMRS pattern configured by using higher-layer signaling, the time-frequency domain overhead reference value for the DMRS is an average value of a number of symbols for all DMRS patterns configured by using the higher-layer signaling.

2. The method according to claim 1, wherein when a PSFCH is configured for a resource pool, the number of symbols for the time-frequency domain overhead reference value for the DMRS is a first symbol quantity; and when no PSFCH is configured for the resource pool, the number of symbols for the time-frequency domain overhead reference value for the DMRS is a second symbol quantity.

3. The method according to claim 1, wherein the number of symbols for the time-frequency domain overhead reference value for the DMRS is a third symbol quantity, and the third symbol quantity is a quantity indicated by a first-stage SCI.

4. The method according to claim 1, wherein the determining the time-frequency domain overhead reference value for the DMRS comprises:

determining the time-frequency domain overhead reference value for the DMRS based on a time-frequency domain resource occupied by a physical sidelink shared channel PSSCH, wherein the time-frequency domain resource occupied by the PSSCH is a time-frequency domain resource for data transmission by the terminal or a time-frequency domain resource indicated by a first-stage SCI.

5. The method according to claim 4, wherein on a first DMRS symbol, the time-frequency domain overhead reference value for the DMRS is 1/N of the time-frequency domain resource occupied by the PSSCH, wherein Nis an integer greater than 1.

6. The method according to claim 4, wherein the time-frequency domain resource occupied by the PSSCH is related to a number of subchannels and a subchannel size for the terminal.

7. The method according to claim 1, wherein when a second DMRS symbol overlaps a PSCCH symbol, the time-frequency domain overhead reference value for the DMRS on the second DMRS symbol is an overhead reference value excluding a first preset value.

8. The method according to claim 7, wherein the first preset value is a size of a subchannel in which the PSCCH is located, or is a size of a subchannel in a resource pool in which the terminal is located, or is a size of a time-frequency domain resource occupied by the PSCCH.

9. The method according to claim 8, wherein when a subchannel size for the terminal is less than a second preset value, the first preset value is the size of the subchannel in which the PSCCH is located or the size of the subchannel in the resource pool in which the terminal is located; or, wherein when a subchannel size for the terminal is greater than or equal to a second preset value, the first preset value is the size of the time-frequency domain resource occupied by the PSCCH.

10. The method according to claim 1, wherein when the DMRS comprises a third DMRS symbol and no PSSCH is mapped on the third DMRS symbol, the time-frequency domain overhead reference value for the DMRS on the third DMRS symbol is a third preset value.

11. The method according to claim 10, wherein the third DMRS symbol is determined based on a number of available PSSCH symbols and an indicated DMRS pattern; or, wherein the third preset value is 1/N of a time-frequency domain resource occupied by a PSSCH, wherein N is an integer greater than 1; and the time-frequency domain resource occupied by the PSSCH is a time-frequency domain resource for data transmission by the terminal or a time-frequency domain resource indicated by a first-stage SCI; or, wherein when a cyclic prefix is a normal cyclic prefix (NCP), the third DMRS symbol is DMRS symbol 10; or when a cyclic prefix is an extended cyclic prefix (ECP), the third DMRS symbol is DMRS symbol 8, DMRS symbol 9, or DMRS symbol 10.

12. A terminal, comprising a processor, a memory, and a program stored in the memory and capable of running on the processor, wherein when the program is executed by the processor, the following steps are implemented:

determining an overhead reference value for DMRS based on first information, wherein the first information comprises at least one of physical sidelink feedback channel (PSFCH) configuration information, sidelink control information (SCI), or higher-layer signaling configuration information, and the overhead reference value comprises a time-frequency domain overhead reference value, wherein the time-frequency domain overhead reference value for the DMRS is determined based on a pattern of the DMRS, when the pattern of the DMRS is a DMRS pattern configured by using higher-layer signaling, the time-frequency domain overhead reference value for the DMRS is an average value of a number of symbols for all DMRS patterns configured by using the higher-layer signaling.

13. The terminal according to claim 12, wherein when a PSFCH is configured for a resource pool, the number of symbols for the time-frequency domain overhead reference value for the DMRS is a first symbol quantity; and when no PSFCH is configured for the resource pool, the number of symbols for the time-frequency domain overhead reference value for the DMRS is a second symbol quantity.

14. A non-transitory computer-readable storage medium, wherein the non-transitory computer-readable storage medium stores a program, and when the program is executed by a processor, the following steps are implemented:

determining an overhead reference value for DMRS based on first information, wherein the first information comprises at least one of physical sidelink feedback channel (PSFCH) configuration information, sidelink control information (SCI), or higher-layer signaling configuration information, and the overhead reference value comprises a time-frequency domain overhead reference value, wherein the time-frequency domain overhead reference value for the DMRS is determined based on a pattern of the DMRS, when the pattern of the DMRS is a DMRS pattern configured by using higher-layer signaling, the time-frequency domain overhead reference value for the DMRS is an average value of a number of symbols for all DMRS patterns configured by using the higher-layer signaling.

* * * * *